(12) United States Patent
Smirnov et al.

(10) Patent No.: US 12,056,793 B2
(45) Date of Patent: Aug. 6, 2024

(54) IMAGE PROCESSING METHOD AND APPARATUS AND COMPUTER PROGRAM PRODUCT FOR THE SAME

(71) Applicant: HUAWEI TECHNOLOGIES CO., LTD., Guangdong (CN)

(72) Inventors: Viktor Vladimirovich Smirnov, Moscow (RU); Youliang Yan, Shenzhen (CN); Tao Wang, Beijing (CN); Xueyi Zou, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 406 days.

(21) Appl. No.: 17/556,421

(22) Filed: Dec. 20, 2021

(65) Prior Publication Data

US 2022/0114770 A1 Apr. 14, 2022

Related U.S. Application Data

(63) Continuation of application No. PCT/RU2019/000455, filed on Jun. 25, 2019.

(51) Int. Cl.
*G06T 11/00* (2006.01)
*G06N 3/04* (2023.01)
(Continued)

(52) U.S. Cl.
CPC .............. *G06T 11/001* (2013.01); *G06N 3/04* (2013.01); *G06T 3/4007* (2013.01); *G06T 3/4046* (2013.01)

(58) Field of Classification Search
CPC ... G06T 11/001; G06T 3/4007; G06T 3/4046; G06T 1/20; G06N 3/04
See application file for complete search history.

(56) References Cited

U.S. PATENT DOCUMENTS 6,941,011 B2   9/2005   Roylance et al.
7,487,153 B2   2/2009   Makhervaks et al.
(Continued)

FOREIGN PATENT DOCUMENTS

CN   107464210 A   * 12/2017   ............... G06N 3/08
CN   107464210 A     12/2017
(Continued)

OTHER PUBLICATIONS

Fdhal, Nawar "Color Space Transformation from RGB to CIELAB Using Neural Networks" (Year: 2009).*
(Continued)

*Primary Examiner* — Molly Wilburn
(74) *Attorney, Agent, or Firm* — Fish & Richardson P.C.

(57) ABSTRACT

Example methods, apparatuses, and computer program products for processing images by using a convolutional neural network (CNN) are described herein. In one example, an original image is received from an image source. The original image has a predefined size and high resolution, and is represented in a first color space supported by the image source. Then, an intermediate image is obtained by downscaling the original image in the first color space, and converted from the first color space to a second color space. Next, a restored image is obtained by upscaling the converted intermediate image to the predefined size of the original image. Upscaling is performed by using the CNN on the original image and the converted intermediate image as inputs and return the restored image. The CNN is pre-trained on a set of triplets, comprising a past original image, a converted past intermediate image and a past restored image.

17 Claims, 7 Drawing Sheets

(51) Int. Cl.
  *G06T 3/4007* (2024.01)
  *G06T 3/4046* (2024.01)

(56) References Cited

U.S. PATENT DOCUMENTS

| | | | |
|---|---|---|---|
| 8,868,604 B2 | 10/2014 | Li | |
| 2004/0002974 A1 | 1/2004 | Kravitz et al. | |
| 2009/0094243 A1 | 4/2009 | Oshri et al. | |
| 2018/0082407 A1 | 3/2018 | Rymkowski et al. | |
| 2018/0300850 A1 | 10/2018 | Johnson et al. | |
| 2019/0045168 A1* | 2/2019 | Chaudhuri | G06T 3/4053 |
| 2019/0130217 A1* | 5/2019 | Wu | G06T 5/20 |

FOREIGN PATENT DOCUMENTS

| | | | | |
|---|---|---|---|---|
| CN | 107578367 A * | 1/2018 | | |
| CN | 107578367 A | 1/2018 | | |
| EP | 3481041 A1 * | 5/2019 | | G01J 3/462 |
| EP | 3481041 A1 | 5/2019 | | |

OTHER PUBLICATIONS

Wu, Huikai "Fast End-to-End Trainable Guided Filter" (Year: 2018).*
Tominaga, Shoji "Color Conversion Using Neural Networks" SPIE3300 (Year: 1998).*
Vrhel, Michael "Color Image Resolution Conversion" IEE Transactions on Image Processing (Year: 2005).*
Araim Yoshifumi "A Method for Transormation for CIE L*a*b Value to CMY Value by Three-Layered Neural Network" (Year: 1993).*
Gharbi, M. "Deep Bilateral Learning for Real-Time Image Enhancement" SIGGRAPH (Year: 2017).*
International Search Report PCT/RU2019/00455 (Year: 2019).*
Marcu, Gabriel "RGB-YMCK Color Conversion by Application of the Neural Networks" (Year: 1993).*
Vrhel, "Color image resolution conversion," IEEE Transactions On Image Processing, vol. 14, No. 3, Mar. 2005, pp. 328-333.
Wu et al, "Fast End-to-End Trainable Guided Filter," CoRR, submitted on Mar. 15, 2018, arXiv: 1803.05619v1, 13 pages.
Marcu et al., "RGB-YMCK Color Conversion by Application of the Neural Networks," Color and Imaging Conference, vol. 1993, No. 1, Jan. 1, 1993, pp. 27-32.
Gharbi et al, "Deep Bilateral Learning for Real-Time Image Enhancement," Proceedings of the 44th Annual Conference on Computer Graphics and Interactive Techniques, Jul. 30-Aug. 3, 2017, 82 pages.
Fdhal et al., "Color Space Transformation from RGB to CIELAB Using Neural Networks," Proceeding of Advances In Multimedia Information Processing—PCM 2009, Dec. 12-18, 2009, pp. 1011-1017.
Tominaga, "Color Conversion Using Neural Networks," Proceedings of SPIE 3300, Color Imaging: Device-Independent Color, Color Hardcopy, and Graphic Arts III, Jan. 2, 1998, pp. 66-75.
Arai et al., "A method for transformation from CIE L*a*b* value to CMY value by a three-layered neural network," Transactions of the Institute of Electronics, Information and Communication Engineers, Section J-D-2, Tokyo, Japan, vol. J76D-11, No. 5, May 1993, pp. 967-975 (with English abstract).
International Search Report and Written Opinion in International Appln. No. PCT/RU2019/000455, mailed on Oct. 23, 2019, 15 pages.

* cited by examiner

IMAGE PROCESSING METHOD AND APPARATUS AND COMPUTER PROGRAM PRODUCT FOR THE SAME

CROSS-REFERENCE TO RELATED APPLICATIONS

This application is a continuation of International Application No. PCT/RU2019/000455, filed on Jun. 25, 2019, the disclosure of which is hereby incorporated by reference in its entirety.

TECHNICAL FIELD

The present disclosure relates to the field of image processing, and, more specifically, to a method, apparatus, and computer program product for processing images by using a convolutional neural network (CNN).

BACKGROUND

An Image Processing Pipeline (IPP) is commonly used to transform an original image produced by input optical sensors into a resulting image to be rendered. The high-performance IPP is critical in consumer (especially mobile) devices, domain-specific tasks like the scientific ones (for example, DNA sequencing), etc. Nowadays, Artificial Intelligence (AI) and Deep Learning techniques are widely used in many IPPs. More specifically, CNNs are currently the backbone and state-of-the-art for the majority of Deep Learning tasks relating to image processing. Therefore, the high-performance IPP requires the CNNs with proper inferences.

One possible approach to obtain the high-performance CNN-based IPP consists in lowering image resolution. Briefly speaking, this approach involves downscaling an original image, processing the downscaled image in a controlled manner, and upscaling the processed downscaled image by using the CNNs to original sizes. However, the above approach is domain-specific due to a possible negative effect on a level of details in the original image. In particular, although this approach lowers computations $N^2$ times per N times image resolution decrease, it provides a side effect consisting in serious detail/quality loss. Furthermore, some existing CNN-based IPPs that are based on using the downscaled images, such as Trainable Guided Filters and Deep Bilateral Learning, may not provide adequate real-time processing performance if the original image has a resolution above 1080p (which corresponds to 1920×1080 pixels).

SUMMARY

This summary is provided to introduce a selection of concepts in a simplified form that are further described below in the detailed description. This summary is not intended to identify key features or essential features of the present disclosure, nor is it intended to be used to limit the scope of the present disclosure.

It is an object of the present disclosure to provide a technical solution for transforming original images from an image source into resulting images suitable for an image renderer, without causing serious detail/quality loss and without using complex computational concepts like those used in Trainable Guided Filters and Deep Bilateral Learning.

The object above is achieved by the features of the independent claims in the appended claims. Further embodiments and examples are apparent from the dependent claims, the detailed description and the accompanying drawings.

According to a first aspect, an image processing method is provided, which is performed as follows. At first, an original image is received from an image source. The original image has a predefined size and high resolution, and the original image is represented in a first color space supported by the image source. Then, an intermediate image is obtained by downscaling the original image in the first color space, and converted from the first color space to a second color space supported by an image renderer. Next, a restored image is obtained by upscaling the converted intermediate image to the predefined size of the original image, while providing a similar high resolution of the restored image. Said upscaling is performed by using a convolutional neural network (CNN) configured to receive the original image and the converted intermediate image as inputs and return the restored image based on the inputs. The CNN is pre-trained based on a training set of triplets, each triplet comprising a past original image from the image source, and a converted past intermediate image and a past restored image both corresponding to the past original image. The method thus performed may allow simplifying image processing between the image source and the image renderer, while providing the high resolution of the restored image. Additionally, the method thus performed may be suitable for the real-time processing of the original image having a resolution above 1080p.

In one embodiment of the first aspect, the predefined size of the original image is expressed as (w, h), where w and h are the width and height, respectively, of the original image in pixels. In turn, said downscaling the original image in the first color space is performed such that the intermediate image has a size expressed as (w/4, h/4). This may allow reducing computational costs for further image processing, including the color-space conversion.

In one embodiment of the first aspect, the training set of triplets comprises the past original images similar to the received original image in content, resolution, and lighting conditions. This may allow the CNN to be trained more efficiently.

In one embodiment of the first aspect, each triplet is formed as follows. The past original image represented in the first color space is first received and then downscaled to obtain the past intermediate image in the first color space. Next, the past intermediate image represented in the first color space is converted to the second color space. After that, the past restored image is obtained by converting the past original image represented in the first color space to the second color space. Finally, the past original image is combined with the converted past intermediate image and the past restored image to form the corresponding triplet. This may allow the CNN trained based on the training set of triplets thus formed to operate more efficiently.

In one embodiment of the first aspect, said downscaling the original image and said downscaling each of the past original images are performed by using the same interpolation algorithm or different interpolation algorithms. This may make the method according to the first aspect more flexible in use.

In one embodiment of the first aspect, the original image comprises high-frequency and low-frequency components. In this embodiment, the CNN comprises a first extraction block for extracting the high-frequency components from the original image, a second extraction block for extracting the low-frequency components from the converted intermediate image, and a decoding block for merging the extracted high-frequency and low-frequency components into the restored image. Such architecture of the CNN may allow the CNN to operate more efficiently.

In one embodiment of the first aspect, each of the first extraction block, second extraction block and decoding block comprises at least one 2D convolutional layer of neurons. This may allow the converted intermediate image to be upscaled to the restored image more efficiently.

In one embodiment of the first aspect, the first extraction block and the second extraction block in the convolutional neural network are configured to operate in parallel. This may allow the CNN to operate faster.

According to a second aspect, an image processing apparatus is provided, which comprises at least one processor and a memory coupled to the at least one processor. The memory stores processor-executable instructions which, when executed by the at least one processor, cause the at least one processor to: receive an original image from an image source, the original image having a predefined size and high resolution, and the original image being represented in a first color space supported by the image source; obtain an intermediate image by downscaling the original image in the first color space; convert the intermediate image represented in the first color space to a second color space supported by an image renderer; obtain a restored image by upscaling the converted intermediate image to the predefined size of the original image, while providing a similar high resolution of the restored image. The at least one processor is configured to perform said upscaling by using a convolutional neural network (CNN), and the CNN is configured to receive the original image and the converted intermediate image as inputs and return the restored image based on the inputs. The at least one processor is further configured to pre-train the CNN based on a training set of triplets, each triplet comprising a past original image from the image source, and a converted past intermediate image and a past restored image both corresponding to the past original image. The apparatus thus implemented may allow simplifying image processing between the image source and the image renderer, while providing the high resolution of the restored image. Additionally, the apparatus thus implemented may be suitable for the real-time processing of the original image having a resolution above 1080p.

In one embodiment of the second aspect, the predefined size of the original image is expressed as (w, h), where w and h are the width and height, respectively, of the original image in pixels. In turn, the at least one processor is configured to perform said downscaling the original image in the first color space such that the intermediate image has a size expressed as (w/4, h/4). This may allow reducing computational costs for further image processing, including the color-space conversion.

In one embodiment of the second aspect, the training set of triplets comprises the past original images similar to the received original image in content, resolution, and lighting conditions. This may allow the CNN to be trained more efficiently.

In one embodiment of the second aspect, the at least one processor is further configured to form each triplet by:
- receiving the past original image represented in the first color space;
- obtaining the past intermediate image by downscaling the past original image in the first color space;
- converting the past intermediate image represented in the first color space to the second color space;
- obtaining the past restored image by converting the past original image represented in the first color space to the second color space; and
- combining the past original image with the converted past intermediate image and the past restored image.

This may allow the CNN trained based on the training set of triplets thus formed to operate more efficiently.

In one embodiment of the second aspect, the at least one processor is further configured to perform said downscaling the original image and said downscaling each of the past original images by using the same interpolation algorithm or different interpolation algorithms. This may make the apparatus according to the second aspect more flexible in use.

In one embodiment of the second aspect, the original image comprises high-frequency and low-frequency components. In this embodiment, the CNN comprises a first extraction block for extracting the high-frequency components from the original image, a second extraction block for extracting the low-frequency components from the converted intermediate image, and a decoding block for merging the extracted high-frequency and low-frequency components into the restored image. Such architecture of the CNN may allow the CNN to operate more efficiently.

In one embodiment of the second aspect, each of the first extraction block, second extraction block and decoding block comprises at least one 2D convolutional layer of neurons. This may allow the converted intermediate image to be upscaled to the restored image more efficiently.

In one embodiment of the second aspect, the first extraction block and the second extraction block in the CNN are arranged to operate in parallel. This may allow the CNN to operate faster.

According to a third aspect, a computer program product comprising a computer-readable storage medium storing a computer program is provided. Being executed by at least one processor, the computer program causes the at least one processor to perform the method according to the first aspect. Thus, the method according to the first aspect can be embodied in the form of the computer program, thereby providing flexibility in use thereof.

Other features and advantages of the present application will be apparent upon reading the following detailed description and reviewing the accompanying drawings.

BRIEF DESCRIPTION OF THE DRAWINGS

The essence of the present application is explained below with reference to the accompanying drawings in which.

DETAILED DESCRIPTION

Figure 1:
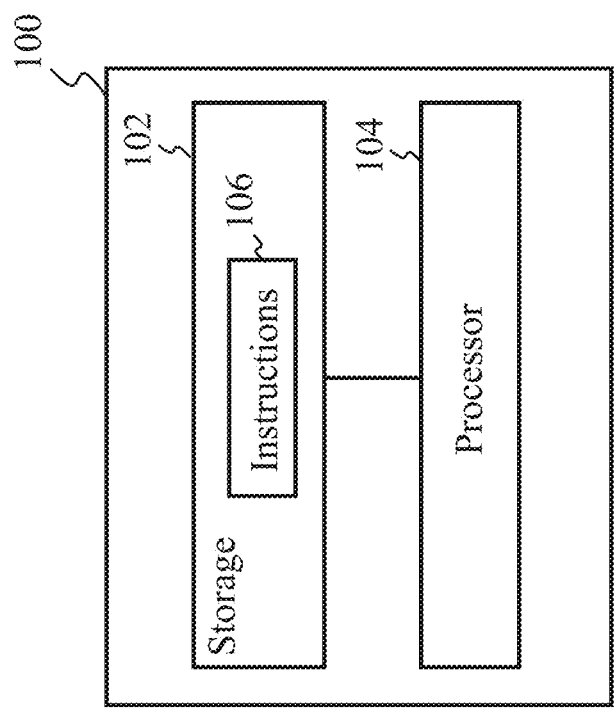
FIG. 1 shows an exemplary block-scheme of an image processing apparatus in accordance with one aspect of the present disclosure.

Various embodiments of the present disclosure are further described in more detail with reference to the accompanying drawings. However, the present disclosure can be embodied in many other forms and should not be construed as limited to any certain structure or function disclosed in the following description. In contrast, these embodiments are provided to make the description of the present disclosure detailed and complete.

According to the present disclosure, it will be apparent to those skilled in the art that the scope of the present disclosure covers any embodiment, which is disclosed herein, irrespective of whether this embodiment is implemented independently or in concert with any other embodiment of the present disclosure. For example, the apparatus and methods disclosed herein can be implemented by using any numbers of the embodiments provided herein. Furthermore, it should be understood that any embodiment of the present disclosure can be implemented using one or more of the elements or steps presented in the appended claims.

In the embodiments of the present disclosure, an image source may refer to a device for capturing an image, such as a camera, an array of optical sensors, a scanner, etc., while an image renderer may refer to a device for rendering the captured image, such as a television set, a computer screen, a computer printer, a display, etc. The image source and the image renderer may be either integrated into one user device (for example, a camera and display in a mobile phone), or implemented as different user devices wirely or wirelessly connected to each other (for example, a laptop camera and a printer).

In the embodiments of the present disclosure, a color space, also known as a color model, may refer to a specific range of colors that a camera can see, a printer can print, or a display can display. Since color spaces supported by the image source and the image renderer commonly differ from each other, the captured image should be processed properly prior to being rendered by the image renderer. Said processing is performed by the so-called image processing pipeline (IPP) that represents a set of intermediate steps between said image capturing and rendering.

To convert the captured image from the color space of the image source to that of the image renderer, the IPP typically involves downscaling the captured image and then performing said color-space conversion on the downscaled image. The reason for doing this is that the color-space conversion requires only knowledge about smooth color gradients present in the captured image, i.e. is based on low-frequency components of the captured image. It should be noted that high-frequency components of the captured image are represented by sharp contrast edges constituting textures/details in the captured image. The high-frequency components are not required in the color-space conversion and therefore can be excluded from consideration to reduce computational and time costs. Said downscaling allows isolating the low-frequency components of the captured image for further color-space conversion. The embodiments of the present disclosure are not limited to any certain color spaces of the image source and the image renderer. As an example, the color space of the image source may be represented by one of the RGB, HSL, HSV, YUV/YIQ/YCbCr and XYZ color models, while the color space of the image renderer may be represented by another of the same color models. Once the color-space conversion is completed, the IPP further involves upscaling or restoring the downscaled image to its original sizes.

In the embodiments of the present disclosure, a convolutional neural network (CNN) may refer to a specialized type of neural networks designed for working with image data. The main component of the CNN is a convolutional layer performing an operation called a convolution. In the context of the CNN, the convolution is a linear operation that involves the multiplication of an array of weights (called a filter or a kernel) with an array of input data. The filter is intentionally smaller than the array of input data, which allows the same filter (or array of weights) to be multiplied by the array of input data multiple times at different points on the input of the CNN. The CNN may comprise multiple convolutional layers to extract different details of the original image data.

Existing IPPs, such as those based on Trainable Guided Filters and Deep Bilateral Learning, use the CNNs to restore downscaled images to their original sizes. Although such CNN-based IPPs provide proper image resolution after the color-space conversion and restoration, they suffer from high complexity and may not provide real-time performance in case of the captured images with a resolution above 1080p.

The present disclosure discussed below takes into account the above-mentioned drawbacks of the existing IPPs, and is aimed at providing a technical solution for the intermediate processing of an original image from the image source without causing serious detail/quality loss and without using complex computational concepts.

FIG. 1 shows an exemplary block-scheme of an image processing apparatus 100 in accordance with one aspect of the present disclosure. As shown in FIG. 1, the apparatus 100 comprises a storage 102 and a processor 104 coupled to the storage 102. The storage 102 stores executable instructions 106 to be executed by the processor 104 to perform the intermediate processing of an original image, which will be discussed later in more detail. In general, the apparatus 100 may be considered as an intermediate between the image source and the image renderer. At the same time, the apparatus 100 may be integrated into one user device together either with both the image source and the image renderer or with one of the image source and the image renderer.

The storage 102 may be implemented as a volatile or nonvolatile memory used in modern electronic computing machines. Examples of the nonvolatile memory include Read-Only Memory (ROM), flash memory, ferroelectric Random-Access Memory (RAM), Programmable ROM (PROM), Electrically Erasable PROM (EEPROM), solid state drive (SSD), magnetic disk storage (such as hard drives and magnetic tapes), optical disc storage (such as CD, DVD and Blu-ray discs), etc. As for the volatile memory, examples thereof include Dynamic RAM, Synchronous DRAM (SDRAM), Double Data Rate SDRAM (DDR SDRAM), Static RAM, etc.

Relative to the processor 104, it may be implemented as a central processing unit (CPU), general-purpose processor, single-purpose processor, microcontroller, microprocessor, application specific integrated circuit (ASIC), field programmable gate array (FPGA), digital signal processor (DSP), complex programmable logic device, etc. It should be also noted that the processor 104 may be implemented as any combination of one or more of the aforesaid. As an example, the processor 104 may be a combination of two or more microprocessors.

The executable instructions 106 stored in the storage 102 may be configured as a computer executable code which causes the processor 104 to perform the aspects of the present disclosure. The computer executable code for carrying out operations or steps for the aspects of the present disclosure may be written in any combination of one or more programming languages, such as Java, C++ or the like. In some examples, the computer executable code may be in the form of a high level language or in a pre-compiled form, and be generated by an interpreter (also pre-stored in the storage 102) on the fly.

Figure 2:
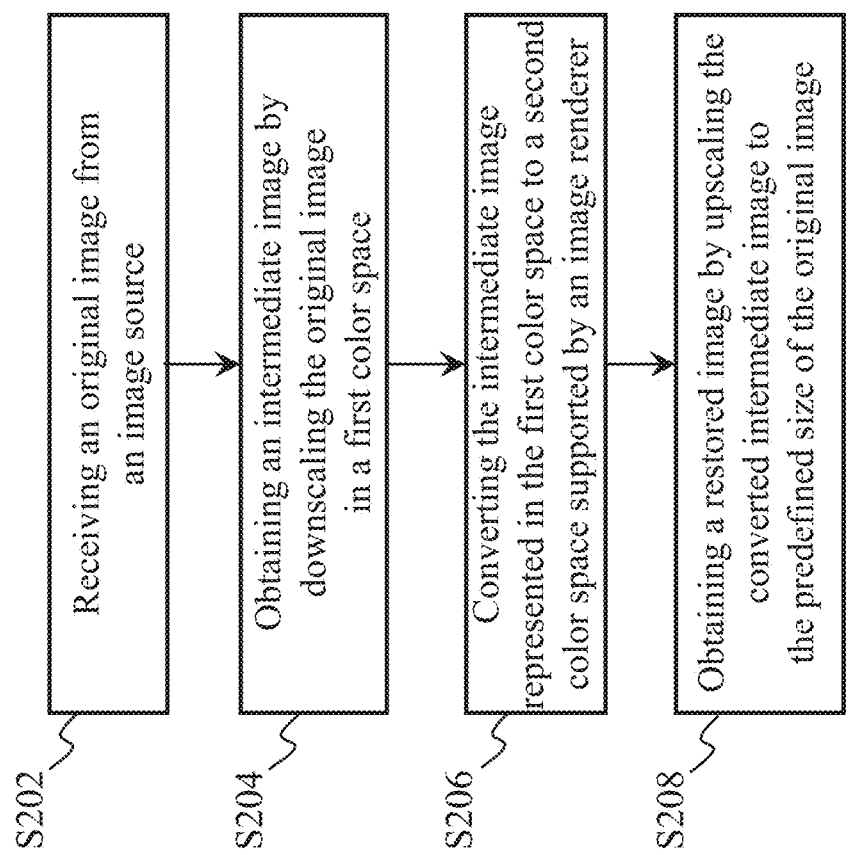
FIG. 2 shows an exemplary block-scheme of an image processing method in accordance with another aspect of the present disclosure.

FIG. 2 shows an exemplary block-scheme of an image processing method 200 in accordance with another aspect of the present disclosure. The method 200 is intended to be performed by the processor 104 of the apparatus 100 when the processor 104 is caused by the instructions 106 from the storage 102 of the apparatus 100. As shown in FIG. 2, the method 200 starts with step S202, in which the processor 104 receives the original image from the image source. The original image has a predefined size and high resolution, and the original image is represented in a first color space supported by the image source. Then, the method 200 proceeds with step S204, in which the processor 104 obtains an intermediate image by downscaling the original image in the first color space. After that, the processor 104 is instructed, in step S206, to convert the intermediate image from the first color space to a second color space supported by the image renderer. The method 200 ends up in step S208, in which the processor 104 obtains a restored image by upscaling the converted intermediate image to the predefined size of the original image, while providing a similar high resolution of the restored image. The processor 104 is instructed, in the step S208, to perform said upscaling by using a convolutional neural network (CNN) configured to receive the original image and the converted intermediate image as inputs and return the restored image based on the inputs. In the meantime, the CNN used in the method 200 is pre-trained based on a training set of triplets, each triplet comprising a past original image from the image source, and a converted past intermediate image and a past restored image both corresponding to the past original image. In general, the method 200 represents the CNN-based IPP that allows simplifying the intermediate processing of original images between the image source and the image renderer, while providing the same or similar resolution of restored images as that of original images.

In one embodiment, if the predefined size of the original image is expressed as (w, h), where w and h are the width and height, respectively, of the original image in pixels, the processor 104 is configured, in the step S204, to perform said downscaling the original image in the first color space such that the intermediate image has a size expressed as (w/4, h/4). The intermediate image thus downscaled may then be processed in the step S206 by using an amount of computational resources less than it would be without the size reduction. However, the present disclosure is not limited to the size reduction to (w/4, h/4), and any other downscaling ratios may be used depending on certain application.

Furthermore, said downscaling the original image in the step S204 may be performed by using any conventional interpolation algorithm. Some examples of the interpolation algorithm include Cubic, Bicubic, Sinc, Linear, Lanczos, and Nearest-Neighbor interpolation techniques.

Figure 3:
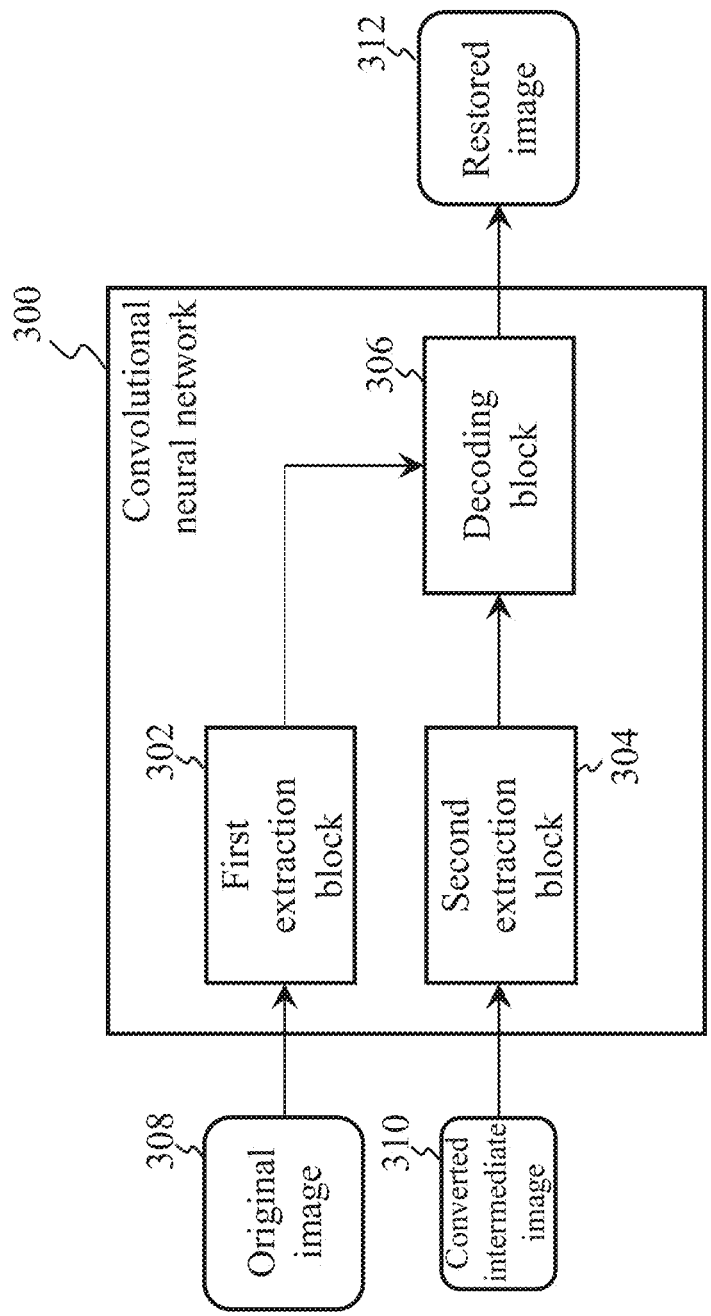
FIG. 3 shows an exemplary block diagram of a convolutional neural network (CNN) used in the method shown in FIG. 2.

FIG. 3 shows an exemplary block diagram of a CNN 300 used in the step S208 of the method 200. The CNN 300 comprises a first extraction block 302, a second extraction block 304, and a decoding block 306. The first extraction block 302 is configured to receive an original image 308 from the image source and extract the high-frequency components therefrom. The second extraction block 304 is configured to receive a converted intermediate image 310, which is obtained from the original image 308 in the step S206 of the method 200, and extract the low-frequency components therefrom. The decoding block 306 is configured to receive the high-frequency components from the first extraction block 302 and the low-frequency components from the second extraction block 304, and merge the high-frequency and low-frequency components into a restored image 312. Each of the first extraction block 302, the second extraction block 304 and the decoding block 306 may comprise at least one 2D convolutional layer of neurons. While the design of the CNN 300 is similar to that of an hourglass-like autoencoder, it is indeed different because the output of the CNN 300 should substantially repeat its input. In other words, the restored image 312 produced by the CNN 300 should have a size and resolution similar to those of the original image 308. The only difference between the original image 308 and the restored image 312 is that they have different color spaces, i.e. the original image 308 is represented in one color space supported by the image source, while the restored image 312 is represented in any other color space supported by the image renderer.

In one embodiment, the first extraction block 302 and the second extraction block 304 in the CNN 300 are configured to operate in parallel. This is done to reduce the time required for extracting the high-frequency and low-frequency components from the original image 308 and the converted intermediate image 310, respectively. At the same time, this configuration of the extraction blocks 302 and 304 should not be considered as any limitation of the present disclosure, and may be replaced with any other configuration depending on certain application.

Figure 4:
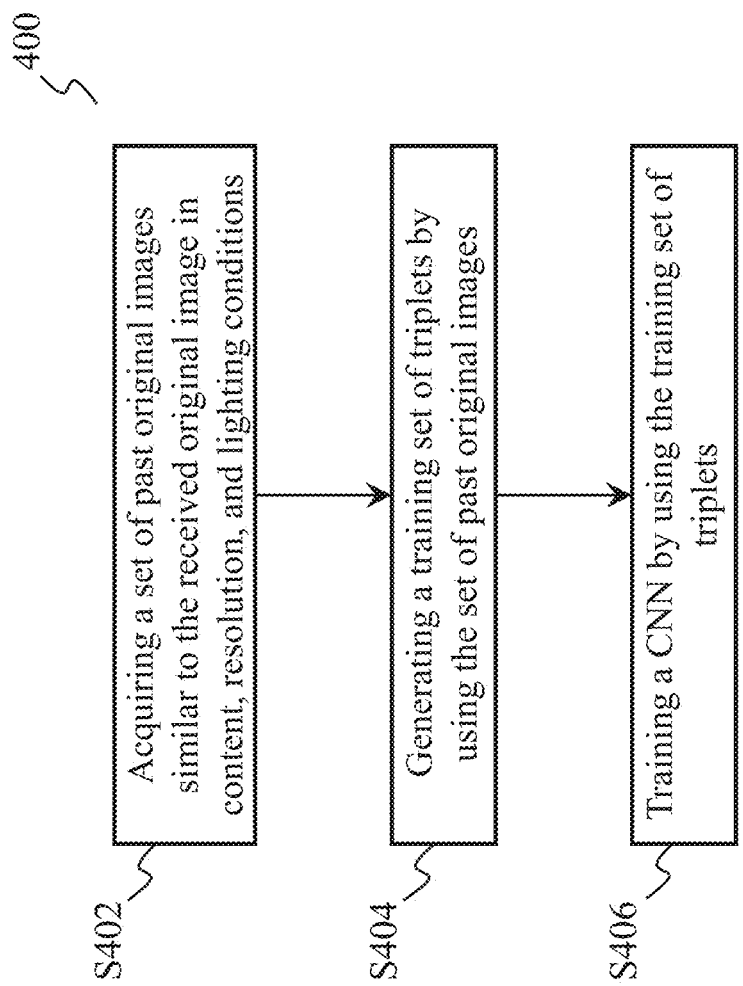
FIG. 4 shows an exemplary block-scheme of a training method used to train the CNN shown in FIG. 3.

As noted above, the CNN 300 should be trained prior to being used in the step S208 of the method 200. This training is performed by using a training method 400 schematically shown in FIG. 4. Similar to the method 200, the training method 400 is performed by the processor 104 of the apparatus 100 when the processor 104 is caused by the instructions 106 from the storage 102 of the apparatus 100. As shown in FIG. 4, the method 400 starts with step S402, in which the processor 104 acquires a set of past original images produced by the image source in the past. More specifically, the processor 104 selects, among all past original images, those which are similar to the original image received in the step S202 of the method 200 in content, resolution, and lighting conditions. This may make the training more efficient. Once the set of past original images is selected, the method 400 proceeds with step S404, in which the processor 104 is instructed to generate a training set of triplets by using the set of past original images. The step S404 will be described below in more detail with reference to FIG. 5. After that, the processor 104 is instructed, in step S406, to train the CNN 300 by using the training set of triplets. The step S406 is repeated by the processor 104 until proper results at the output of the CNN 300. The processor 104 may use different conventional supervised training algorithms to perform the step S406 of the method 400, such, for example, as a backpropagation algorithm. When the step S406 is completed, the CNN 300 is ready to be used in the step S208 of the method 200.

Figure 5:
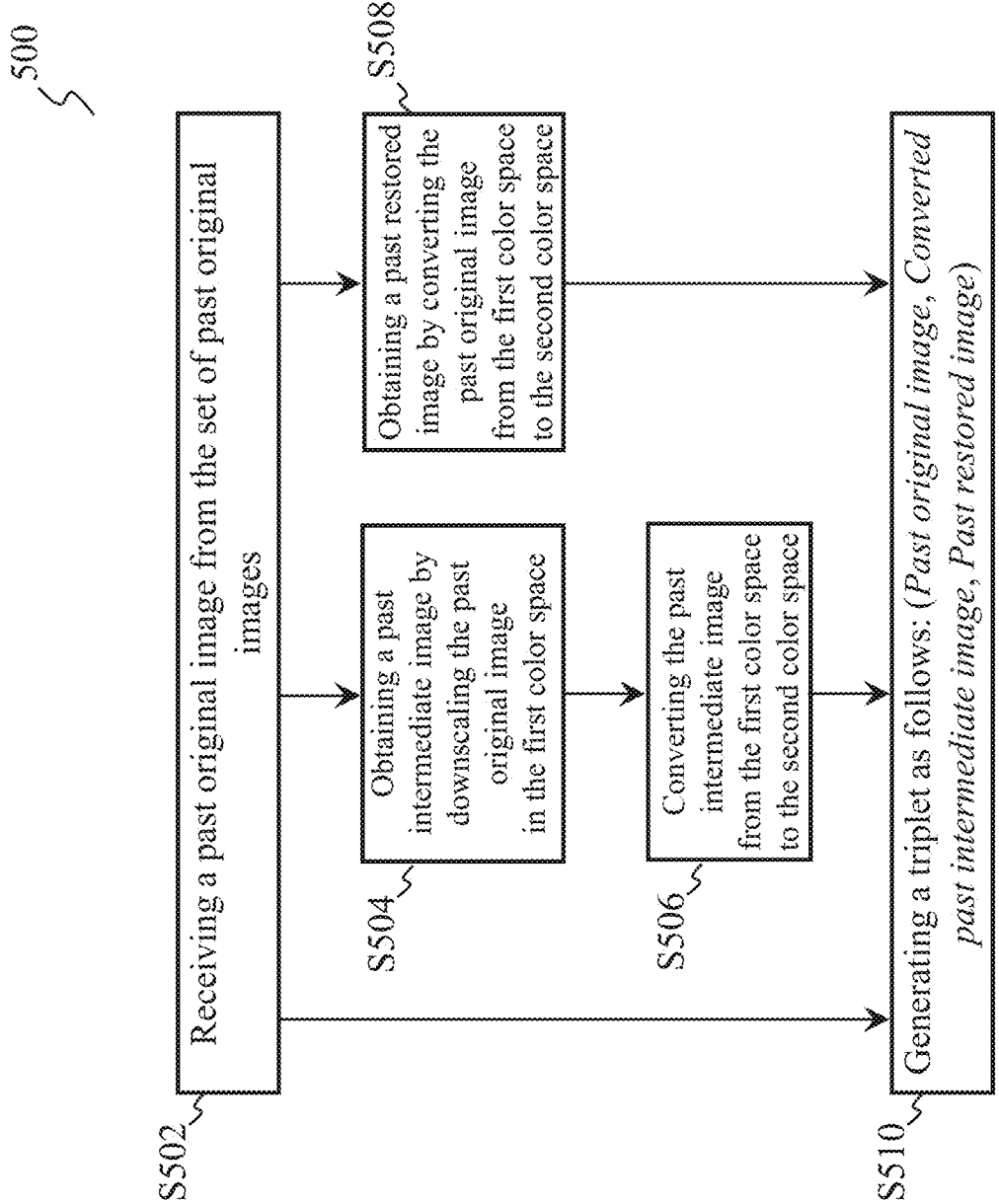
FIG. 5 shows an exemplary flowchart of substeps constituting the step S404 of the method shown in FIG. 4.

FIG. 5 shows an exemplary flowchart 500 of substeps constituting the step S404 of the method 400. In other words, the flowchart 500 of substeps is used to generate each triplet included in the training set of triplets. Similar to the methods 200 and 400, the flowchart 500 of substeps is performed by the processor 104 of the apparatus 100 when the processor 104 is caused by the instructions 106 from the storage 102 of the apparatus 100. More specifically, the flowchart 500 of substeps starts with substep S502, in which the processor 104 receives a past original image from the set of past original images acquired in the step S402 of the method 400.

As its name implies, the triplet comprises three elements each obtained based on the past original image received in the substep S502. In particular, the first element is represented by the past original image itself. The second element is represented by the converted past intermediate image obtained by downscaling the past original image in the first color space in substep S504 and by converting the past intermediate image from the first color space to the second color space in substep S506. The third element is represented by the past restored image obtained by converting the past original image from the first color space to the second color space in substep S508. To reduce the time required for generating the triplet, the substeps S504, 506 and the substep 508 may be performed in parallel. The final substep of the flowchart 500 is substep S510, in which the processor 104 combines the past original image, the converted past intermediate image, and the past restore image into the triplet, i.e. (Past original image, Converted past intermediate image, Past restored image).

In one embodiment, said downscaling the past original image in the substep S504 of the flowchart 500 is performed by using the same interpolation algorithm as that used in the step S204 of the method 200. In one other embodiment, the interpolation algorithms used in the substep S504 and the step S204 are different.

The above-described flowchart 500 of the substeps S502-S510 is repeated in respect of each past original image included the set of past original images acquired in the step S402 of the method 400. The resulting training set of triplets is then used to train the CNN 300 in the step S406 of the method 400. It should be noted that, during the training of the CNN 300, the first two elements of each triplet, i.e. the past original image and the converted past intermediate image, are used as inputs, while the third element of the triplet, i.e. the past restored image, is used as an output or, in other words, target.

Figure 6:
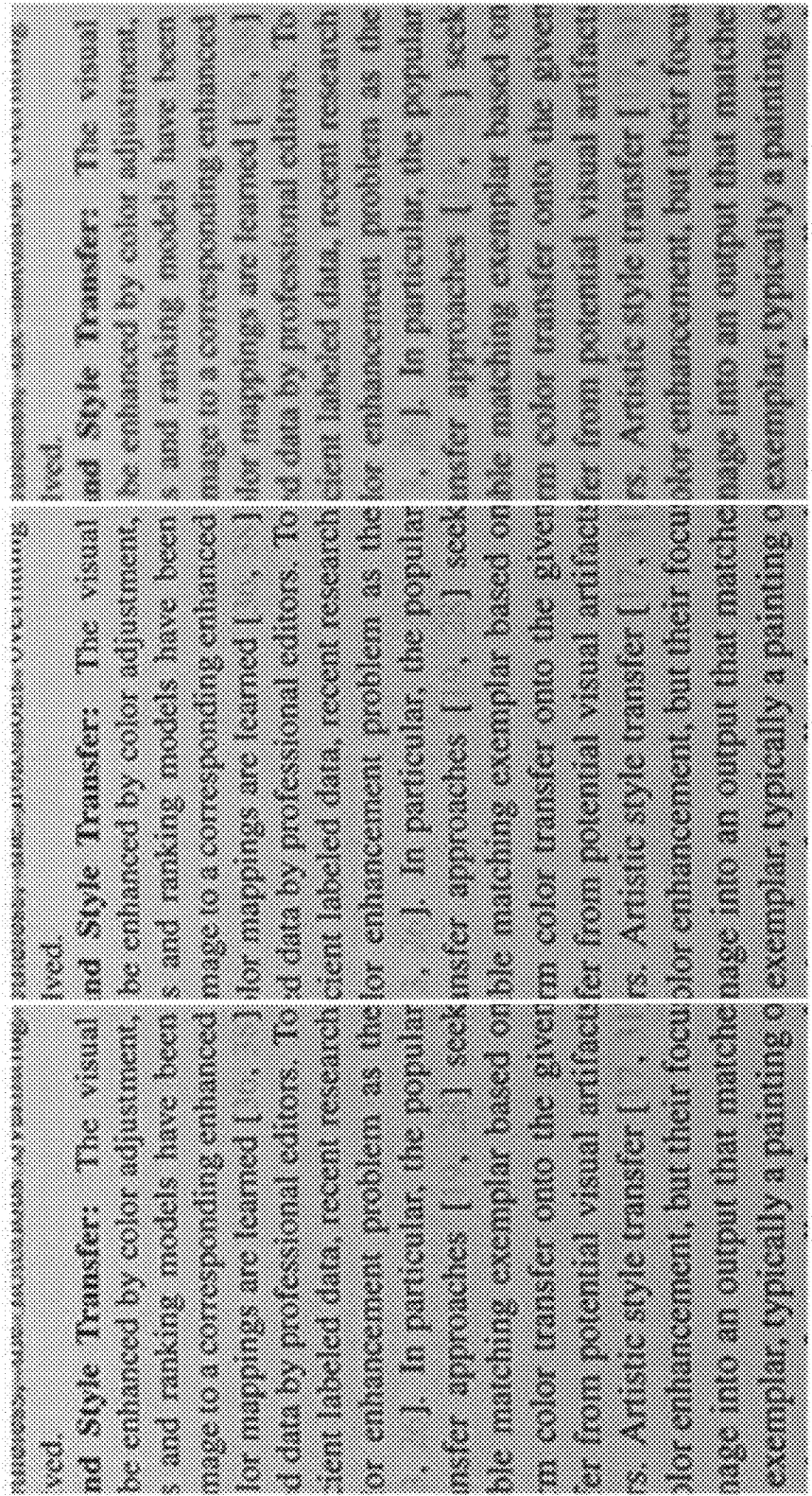
FIGS. 6 and 7 demonstrate the comparison results of the method shown in FIG. 2 and two existing image processing methods, i.e. original High Resolution and Bilinear Upsampling.
Figure 7:
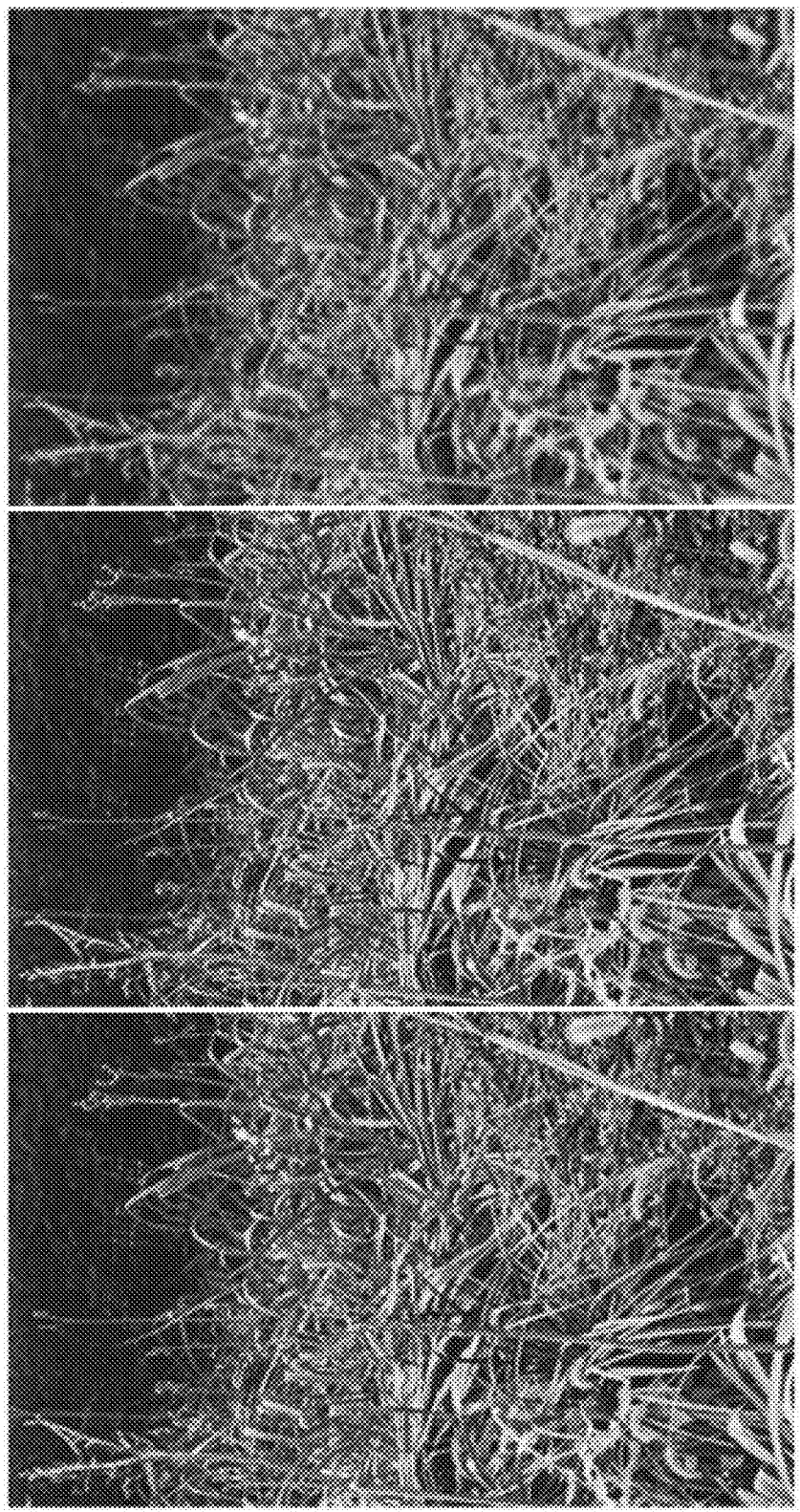

FIGS. 6 and 7 demonstrate the comparison results of the method 200 disclosed herein and two existing image processing methods, such as original High Resolution (HR) and Bilinear Upsampling. In particular, each of FIGS. 6 and 7 illustrates, from left to right, the restored images obtained by using the original HR method, the method 200, and the Bilinear Upsampling method. As can be seen, the original HR method and the method 200 provides a similar resolution of the restored images, which is much better than that provided by the Bilinear Upsampling method. At the same time, the advantage of the method 200 over the original HR method is that the latter is quite complex and not suitable for the real-time processing of the original image having a resolution above 1080p.

Those skilled in the art should understand that each block or step of the methods 200, 400, or each substep of the flowchart 500, or any combinations of the blocks or steps or substeps, can be implemented by various means, such as hardware, firmware, and/or software. As an example, one or more of the blocks or steps or substeps described above can be embodied by computer executable instructions, data structures, program modules, and other suitable data representations. Furthermore, the computer executable instructions which embody the blocks or steps or substeps described above can be stored on a corresponding data carrier and executed by at least one processor like the processor 104 of the apparatus 100. This data carrier can be implemented as any computer-readable storage medium configured to be readable by said at least one processor to execute the computer executable instructions. Such computer-readable storage media can include both volatile and nonvolatile media, removable and non-removable media. By way of example, and not limitation, the computer-readable media comprise media implemented in any method or technology suitable for storing information. In more detail, the practical examples of the computer-readable media include, but are not limited to information-delivery media, RAM, ROM, EEPROM, flash memory or other memory technology, CD-ROM, digital versatile discs (DVD), holographic media or other optical disc storage, magnetic tape, magnetic cassettes, magnetic disk storage, and other magnetic storage devices.

Although the exemplary embodiments of the present disclosure are described herein, it should be noted that any various changes and modifications could be made in the embodiments of the present disclosure, without departing from the scope of legal protection which is defined by the appended claims. In the appended claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage.

The invention claimed is:

1. An image processing method comprising:
receiving an original image from an image source, the original image having a predefined size and high resolution, and the original image being represented in a first color space supported by the image source;
obtaining an intermediate image by downscaling the original image in the first color space;
converting the intermediate image represented in the first color space to a second color space supported by an image renderer to obtain a converted intermediate image;
obtaining a restored image by upscaling the converted intermediate image to the predefined size of the original image, while providing a similar high resolution of the restored image, and
wherein said upscaling is performed by using a convolutional neural network configured to receive the original image and the converted intermediate image as inputs and return the restored image based on the inputs; and
wherein the convolutional neural network is pre-trained based on a training set of triplets, each triplet comprising a past original image from the image source, a converted past intermediate image, and a past restored image, both the converted past intermediate image and the past restored image corresponding to the past original image.

2. The method of claim 1, wherein the predefined size of the original image is expressed as (w, h), where w and h are the width and height, respectively, of the original image in pixels, and said downscaling the original image in the first color space is performed such that the intermediate image has a size expressed as (w/4, h/4).

3. The method of claim 1, wherein the training set of triplets comprises the past original images similar to the received original image in content, resolution, and lighting conditions.

4. The method of claim 1, wherein each training set of triplets is formed by:
receiving the past original image represented in the first color space;
obtaining the past intermediate image by downscaling the past original image in the first color space;
converting the past intermediate image represented in the first color space to the second color space;

obtaining the past restored image by converting the past original image represented in the first color space to the second color space; and combining the past original image with the converted past intermediate image and the past restored image.

5. The method of claim 4, wherein said downscaling the original image and said downscaling each of the past original images are performed by using the same interpolation algorithm or different interpolation algorithms.

6. The method of claim 1, wherein the original image comprises high-frequency and low-frequency components, and the convolutional neural network comprises:
a first extraction block for extracting the high-frequency components from the original image;
a second extraction block for extracting the low-frequency components from the converted intermediate image; and
a decoding block for merging the extracted high-frequency and low-frequency components into the restored image.

7. The method of claim 6, wherein each of the first extraction block, the second extraction block, and the decoding block comprises at least one 2D convolutional layer of neurons.

8. The method of claim 6, wherein the first extraction block and the second extraction block in the convolutional neural network are configured to operate in parallel.

9. An image processing apparatus comprising:
at least one processor; and
a memory coupled to the at least one processor and storing processor-executable instructions which, when executed by the at least one processor, cause the at least one processor to:
receive an original image from an image source, the original image having a predefined size and high resolution, and the original image being represented in a first color space supported by the image source;
obtain an intermediate image by downscaling the original image in the first color space;
convert the intermediate image represented in the first color space to a second color space supported by an image renderer to obtain a converted intermediate image;
obtain a restored image by upscaling the converted intermediate image to the predefined size of the original image, while providing a similar high resolution of the restored image, and
wherein the at least one processor is configured to perform said upscaling by using a convolutional neural network, and the convolutional neural network is configured to receive the original image and the converted intermediate image as inputs and return the restored image based on the inputs, and
wherein the at least one processor is further configured to pre-train the convolutional neural network based on a training set of triplets, each triplet comprising a past original image from the image source, a converted past intermediate image, and a past restored image, both the converted past intermediate image and the past restored image corresponding to the past original image.

10. The apparatus of claim 9, wherein the predefined size of the original image is expressed as (w, h), where w and h are the width and height, respectively, of the original image in pixels, and the at least one processor is configured to perform said downscaling the original image in the first color space such that the intermediate image has a size expressed as (w/4, h/4).

11. The apparatus of claim 9, wherein the training set of triplets comprises the past original images similar to the received original image in content, resolution, and lighting conditions.

12. The apparatus of claim 9, wherein the at least one processor is further configured to form each triplet by:
receiving the past original image represented in the first color space;
obtaining the past intermediate image by downscaling the past original image in the first color space;
converting the past intermediate image represented in the first color space to the second color space;
obtaining the past restored image by converting the past original image represented in the first color space to the second color space; and
combining the past original image with the converted past intermediate image and the past restored image.

13. The apparatus of claim 12, wherein the at least one processor is further configured to perform said downscaling the original image and said downscaling each of the past original images by using the same interpolation algorithm or different interpolation algorithms.

14. The apparatus of claim 9, wherein the original image comprises high-frequency and low-frequency components, and the convolutional neural network comprises:
a first extraction block for extracting the high-frequency components from the original image;
a second extraction block for extracting the low-frequency components from the converted intermediate image; and
a decoding block for merging the extracted high-frequency and low-frequency components into the restored image.

15. The apparatus of claim 14, wherein each of the first extraction block, the second extraction block, and the decoding block comprises at least one 2D convolutional layer of neurons.

16. The apparatus of claim 14, wherein the first extraction block and the second extraction block in the convolutional neural network are arranged to operate in parallel.

17. A computer program product comprising a computer-readable storage medium storing a computer program, the computer program, when executed by at least one processor, causing the at least one processor to:
receive an original image from an image source, the original image having a predefined size and high resolution, and the original image being represented in a first color space supported by the image source;
obtain an intermediate image by downscaling the original image in the first color space;
convert the intermediate image represented in the first color space to a second color space supported by an image renderer to obtain a converted intermediate image;
obtain a restored image by upscaling the converted intermediate image to the predefined size of the original image, while providing a similar high resolution of the restored image, and
wherein said upscaling is performed by using a convolutional neural network configured to receive the original image and the converted intermediate image as inputs and return the restored image based on the inputs, and
wherein the convolutional neural network is pre-trained based on a training set of triplets, each triplet comprising a past original image from the image source, a converted past intermediate image, and a past restored image, both the converted past intermediate image and the past restored image corresponding to the past original image.

* * * * *